UNITED STATES PATENT OFFICE.

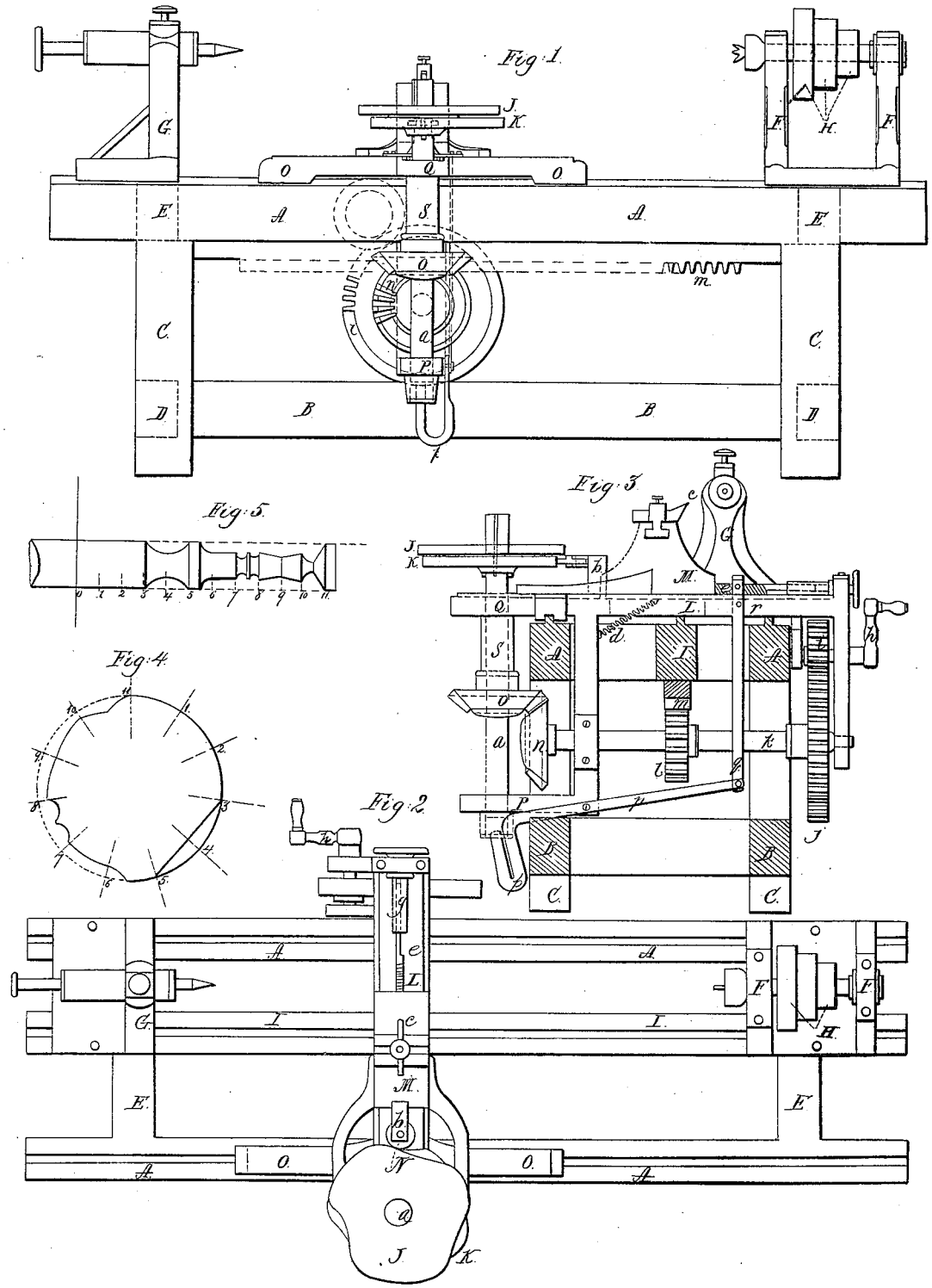

ALLEN GOODMAN AND HAMMOND DOANE, OF DANA, MASSACHUSETTS.

LATHE FOR TURNING.

Specification of Letters Patent No. 6,843, dated November 6, 1849.

*To all whom it may concern:*

Be it known that we, ALLEN GOODMAN and HAMMOND DOANE, of Dana, in the county of Worcester and State of Massachusetts, have invented a new and useful Improvement on Machinery for Turning Irregular Forms; and we do hereby declare that the following is a full, clear, and exact description.

The nature of our invention consists in the arrangement of a series of cam patterns on a vertical shaft, in combination with the tool stock of a lathe, to govern or guide the cutting tool, to produce two or more different patterns on circular wood or other such works; on one piece, on the way of its length, such as upon such kinds of work as table legs, bed posts, &c. For example—if two different patterns are to be produced on a table leg, one at the lower or narrowest end, and the other at the upper end. The uppermost cam pattern on the vertical shaft will guide the cutter to turn the pattern on the lower end of the table leg, and then, the second cam pattern will be raised up against a friction wheel to guide the cutter to turn a different pattern or one of greater dimensions, on the upper end of the table leg.

To enable others skilled in the art to make and use our invention, we will proceed to describe its construction and operation, reference being had to the annexed drawings forming a part of this specification, in which the same letters refer to like parts.

We construct the frame of our lathe and puppet heads in the usual way as shown in Figure 1, in which A, A, represents the upper front side beam; C, C, the end uprights; D, D, the ends of lower cross-braces; E, E, the ends of upper cross-beams; F, F, the head stock of the lathe; G, tail stock; and H, the driving pulley.

By Fig. 2 is presented a vertical view of the lathe, showing the center beam I, I, and also the eccentric cam-patterns J and K, the one lying upon the other, which superincumbent position is more distinctly represented in Figs. 1 and 3. These cam-patterns are flat pieces of wood or other substance, made in an eccentric form, the periphery being indented, or elevated and depressed, according to any design for turning that may be desired. They are secured in the center on the head of a vertical shaft or spindle $a$, which passes through the end of a horizontal cross-rail L, seen in Figs. 2 and 3, on which cross-rail also rests the cutter head stock M, and the supporting frame $b$, of a friction wheel N, which works against the periphery of the cam-patterns J and K, to either of which it may be adjusted; and the said friction-wheel frame and the head stock of the cutter, are both made to slide upon the cross-rail L. The friction-wheel frame $b$ lies between the cam-patterns J and K and the cutter head stock M, and as the friction-wheel N follows the sinuosities of the periphery of the said cam-patterns when they revolve on the spindle $a$, it slides back and forth, giving a similar sliding movement to said cutter head stock, and keeping the cutter $c$, (which is gage shaped) up to the work in turning. As the friction wheel N rises in the sinuosities of the cam-pattern, it pushes the cutter head stock toward the work, but as it falls in the same it resists the head stock, which is drawn back against the frame $b$ by a spiral spring $d$ which is fastened to the under side of the head stock, as seen in Fig. 3. There is an adjusting and steady pin $e$, which screws into the cutter head stock at one end and at the other end passes into a muff or ruffle $g$, in which it slides back and forth, the part which enters said muff being semi-circular in form to prevent it from turning therein; and the object of this arrangement is to allow the said cutter head stock to slide to and fro, while at the same time it is steadied and kept in place on the cross-rail L.

On the top of the front upper side-beam A, A, is a slide O, O, which is fastened as a cross-head on the rail L and guides the cutter head stock lengthwise of the lathe. The slide O, O, receives its movement from a crank $h$, which turns a small pinion $i$, which drives a larger wheel $j$, into which it works, upon the axle $k$ of which is a pinion $l$, which meshes into a rack $m$, placed under and fastened to the center beam I, as seen in Figs. 1 and 3. Upon the end of the axle $k$ is placed a vertical bevel wheel $n$ which works into a horizontal match wheel $o$ through which passes the shaft or spindle $a$, and from which the said spindle takes its motion and revolves the cam-patterns J and K.

The lower end of the spindle $a$ rests upon the end of a lever $p$, $p$, which is bent and turned up, and by the elevation and depression of said lever the said spindle is made to slide up and down through a lower support P; through an upper support Q (which is an extension of the cross rail M,) and through the horizontal bevel wheel o. By raising and lowering the spindle a, the cam-patterns J and K are changed, that is, one or the other is brought into connection with the friction-wheel N at pleasure. The lever p, p, is moved by a swivel handle q, which has adjusting catch-holes in its upper end which fasten it on a pin at r and hold the lever p, p, in such a position of elevation or depression as to regulate the said cam-patterns. The spindle a, is keyed into and made fast to the horizontal bevel wheel O, while the lathe is in operation, a mortise being cut in its side for the purpose of receiving the key. When the pattern of the work is to be changed, then the key is taken out, which releases the spindle and allows it to slide up and down freely. The horizontal bevel wheel O is kept in place by a muff or ruffle S between it and the upper support Q, through which muff the said spindle passes.

When the lathe is in operation the crank h is turned, which gives motion to the running gear before described, turning the cam-patterns J and K, and moving the head stock of the cutter lengthwise of the lathe, from end to end.

A vertical view of a detached cam-pattern is exhibited by Fig. 4, which is divided into numbered sections, showing the correspondence of the pattern with a piece of turned work, also divided into sections and numbered, represented by Fig. 5.

What we claim as our invention and for which we desire to secure Letters Patent is—

The combination of the sliding cutter stock M, the friction wheel N and two or more patterns J, K, the spindle, a, and the changing lever, p, p, substantially as herein described and for the purpose set forth.

ALLEN GOODMAN.
HAMMOND DOANE.

Witnesses:
MARTHA JOHNSON,
NATHL. JOHNSON.